(No Model.)
2 Sheets—Sheet 1.

C. I. HALL.
ELEVATOR VALVE MECHANISM.

No. 443,644.
Patented Dec. 30, 1890.

Witnesses
Geo. H. Strong.

Inventor,
Cofran I. Hall
By Dewey & Co.
atty.

(No Model.) 2 Sheets—Sheet 2.

C. I. HALL.
ELEVATOR VALVE MECHANISM.

No. 443,644. Patented Dec. 30, 1890.

Witnesses,
Geo. H. Strong
J. Strause

Inventor,
Cofran I. Hall.
By Dewey & Co.
attys

UNITED STATES PATENT OFFICE.

COFRAN I. HALL, OF SAN FRANCISCO, CALIFORNIA, ASSIGNOR OF ONE-HALF TO PATRICK CAHILL, OF SAME PLACE.

ELEVATOR VALVE MECHANISM.

SPECIFICATION forming part of Letters Patent No. 443,644, dated December 30, 1890.

Application filed May 2, 1890. Serial No. 350,378. (No model.)

*To all whom it may concern:*

Be it known that I, COFRAN I. HALL, a citizen of the United States, residing in the city and county of San Francisco, State of California, have invented an Improvement in Elevator Valve Mechanisms; and I hereby declare the following to be a full, clear, and exact description of the same.

My invention relates to certain improvements in valve mechanism for hydraulic elevators, and it is especially applicable to that class of elevators in which a body of water or other inelastic fluid is contained within a compression-chamber, said fluid being acted upon by an elastic medium under pressure—such as steam or air—so as to force it into the cylinder to act upon the piston by which the elevator-cage is moved.

My present invention consists in such improvements in the valves and the means for actuating them as to prevent irregular movements of the elevator, which would be caused by variations in the pressure, and in certain details of construction, all of which will be more fully explained by reference to the accompanying drawings, in which—

Figure 1:
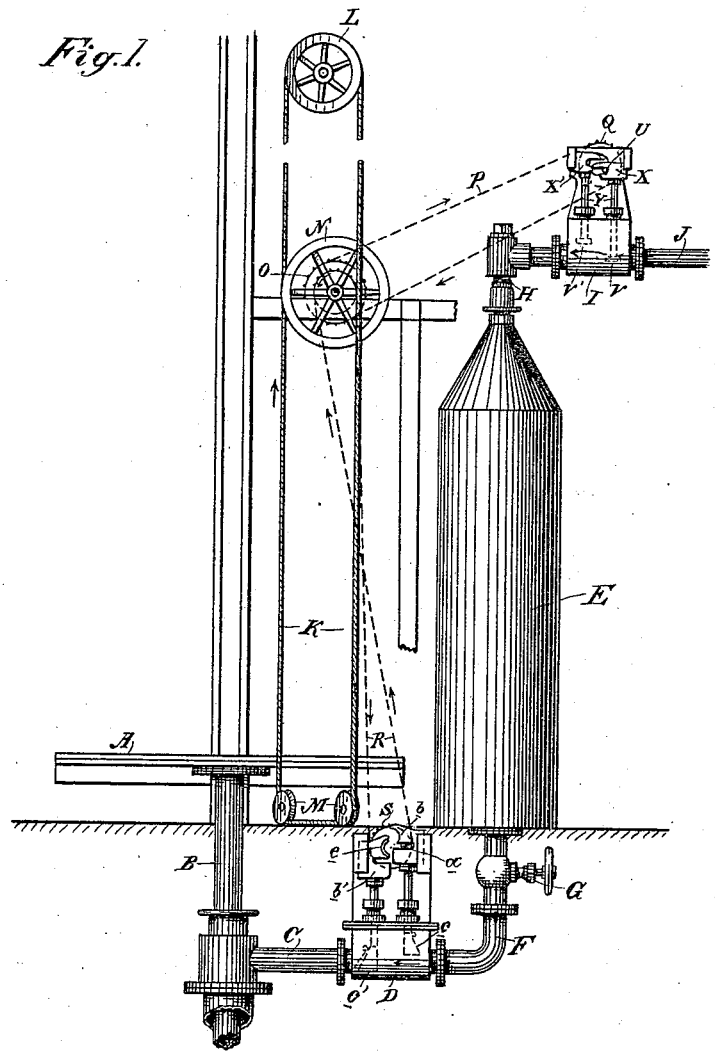
Figure 2:
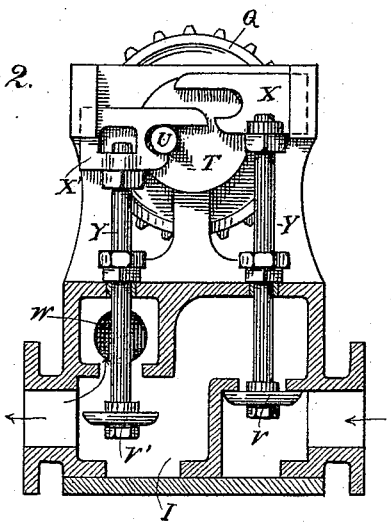
Figure 3:
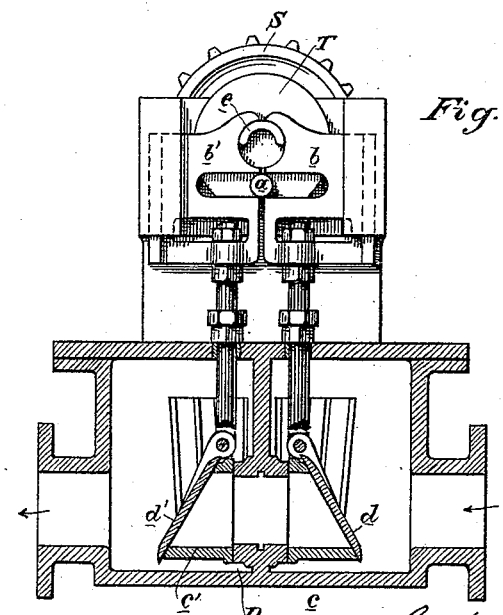

Figure 1 is an elevation showing the elevator-cage and the mechanism through which hydraulic pressure is applied to move it. Fig. 2 is an enlarged view showing the steam-valves and the mechanism by which they are actuated. Fig. 3 is an enlarged section of the water-valves and the mechanism for operating them.

In the present case I have shown my invention as applied to what is known as the "ram-elevator," in which the cage is raised and lowered by a piston moving vertically in the line of travel of the cage itself; but it will be manifest that it may be applied to elevators having short cylinders, with multiplying connections for operating the cage.

A is the elevator-cage, which is supported upon the head of the piston B, this piston moving in a vertical cylinder into which water is admitted through the pipe C to operate the piston and raise the cage, and when the cage is to descend the water is allowed to escape through this pipe.

D is the casing containing the valves through which water is admitted and allowed to escape, which valves will be more fully described hereinafter.

E is a pressure-chamber, which is here shown as made cylindrical in form, having a conical top, and the area of this chamber is a little more than is necessary to supply the amount of water necessary to raise the cage to its highest elevation and to receive said water from the cylinder when the cage is allowed to descend to its lowest point. A connection between the valve-chamber D and the chamber E is made through the pipe F, and may be entirely cut off at any time by means of a valve or gate at G. The upper end of the chamber E is connected by a pipe and suitable appliances, as shown at H, with a valve-chamber I, containing valves through which steam is admitted from the pipe J and source of supply into the upper part of the chamber E, so that it may press upon the water contained within this chamber and force the water through the valves in the chamber D and into the elevator-cylinder with such pressure as may be necessary to raise the load upon the elevator.

K is the rope passing through the elevator-cage within reach of the operator, by which the valves are opened and closed. This rope passes around a pulley L at the upper end in the usual manner, and around the pulley or pulleys M at the lower end to give it the proper direction. This rope engages with a pulley N by making a turn around said pulley, or in any other suitable way, so that the movement of the rope will rotate this pulley in either one direction or the other, as the case may be.

Upon the shaft of the pulley N is a sprocket-wheel O, around which passes a chain P, this chain also passing around another sprocket-wheel Q, through which the steam-valves are actuated. The chain R is also driven by a sprocket-wheel on the shaft of the pulley N, and through it the wheel or disk S is actuated to operate the water-valves.

Upon the shaft of the sprocket-wheel Q is a disk T, having a crank-pin U projecting from its face.

The steam-valves within the case I consist of an inlet-valve V and an outlet-valve V', with suitable passages arranged, as shown, so that when the inlet-valve is opened steam will be admitted through the valve-passages in the pipe H in the upper part of the water-chamber E, and when the steam-valve is closed and the exhaust-valve is opened the steam will be allowed to escape through the exhaust-valve and the exhaust-passage W.

In order to operate these valves, I have shown the heads X X' fixed upon the upper end of the valve-stems Y, so as to travel in suitable guides and in such positions that their inner ends extend a little past each other, overlapping in front of the disk T, so that the crank-pin U may engage the slots or forked ends of the heads X, as shown.

The operation of this mechanism will be as follows: When the sprocket-wheel Q is turned in the direction shown by the arrows for the purpose of raising the elevator, the pin U, traveling within the forked end of the head of the exhaust-valve stem, will, in performing its half-circuit from its lowest to its highest point, raise the head, and with it the valve-stem. This closes the exhaust-valve, which would have been left open by the previous descent of the elevator-cage, and thus closes the exhaust-passage. The pin U, continuing its movement, then engages the forked end of the head X and the steam-valve stem, and as it continues its movement from the highest to its lowest point it will move this head, the valve-stem, and the valve downward, thus opening the steam-valve and allowing the steam to pass through the various passages into the upper part of the chamber E, and thus press upon the water within the chamber. The water-gates within the valve-chamber D are at the same time operated by the rotation of the sprocket-wheel S, and the corresponding disk fixed upon the shaft of this wheel with a similarly-arranged pin $a$ projecting from the disk and engaging the heads $b$ and $b'$ of the inlet and outlet valves or gates, so that these valves are opened and closed by raising the valve-stems. These water-valves are shown at $c$ and $c'$ and are so constructed as to slide up and down, the one being closed before the other is opened. To these valves are hinged the supplemental flat valves $d$ and $d'$, which may move independently of the main valves, and which open outwardly, as shown in Fig. 3. The object of these supplemental valves is as follows: In this class of elevators where the pressure of steam or other elastic medium upon water contained within a vessel or chamber, such as is shown at E, is employed to raise an elevator-cage, certain difficulties have arisen from the variation of elastic pressure and load, the principal difficulty being the temporary movement of the cage in the wrong direction when it is either desired to ascend or descend. This occurs as follows: If the cage is to be raised from some point with a considerable load, as, say, one ton, upon it, a certain pressure must be applied within the chamber E, and when this load is removed the elastic pressure within the chamber E will remain considerably greater than is necessary to counterbalance the cage. Therefore, if the valves be opened for the purpose of allowing the cage to descend, instead of the water escaping directly from the elevator-cylinder into the chamber and allowing the cage to gradually descend, the first action will be to force more water out of the chamber into the elevator-cylinder, and thus temporarily raise the elevator a short distance on account of the superior pressure within the chamber E, which remained after the weight upon the cage had been removed, and the elevator will thus be forced up until this pressure is reduced by this temporary rising of the cage and the escape of the elastic medium through the exhaust-valve V', so as to allow it to descend. In the same manner, when the cage has been allowed to descend to any point and is stopped there, all the pressure will be exhausted from the chamber E, and when the valves are opened for the purpose of again raising the elevator the cage will drop a short distance until the pressure within the cylinder has reached a point sufficient to again counterbalance and raise it. The supplemental flat valves $d$ and $d'$, which I have here described, serve to counteract this action in the following manner: It will be understood that when the elevator is stopped all the valves are closed by bringing all the valve-operating devices to the center of their movements. If the cage has been raised to some point with a heavy load and this load is removed after the valves are closed, it will be manifest that the pressure necessary to raise the load will still remain in the chamber, and when it is desired to descend the valve $c'$ is opened by means of the operating mechanism previously described, the valve $c$ remaining closed. When these valves are brought to the above-described positions, the fluid is free to flow from the elevator-cylinder to the chamber E, but not in the opposite direction. Therefore the elevator cannot react upward, no matter what pressure there is remaining in the chamber E, and when the pressure is sufficiently reduced the elevator will descend, as desired. It will be manifest that the superior pressure within the chamber E, acting upon the back of the flat valve $d$, will prevent the water from escaping from the cylinder until this pressure has been reduced by the opening of the steam-exhaust valve, and until the pressure within the chamber E is reduced below that in the elevator-cylinder. The water can then by its own pressure raise the valve $d$ and flow back into the chamber E; but until the pressure in the chamber E has been reduced below that in the elevator-cylinder it will be manifest that this valve $d$ will remain closed, and will thus prevent any pressure from the chamber E being transmitted to the elevator-cylinder so as to raise the cage in the manner previously described.

In the same manner, when the cage is at the bottom, or at any point from which it is desired to raise it, the movements of the valve-operating mechanism will open the valve c. If the pressure within the chamber E has been reduced by condensation of steam below that necessary to counterbalance and raise the load in the elevator, it will be manifest that the flat valve d' will in a like manner remain closed against any pressure from the elevator-cylinder which would tend to force water into the chamber E before the pressure within that chamber had become sufficient to counterbalance and raise the cage. By this construction I am enabled to provide a perfect check against those undesirable movements which usually take place in this class of elevators. The valves c and c' are locked in either of their positions by means of the semicircular lug e, which projects from the face of the disk, and which, when turned so as to lie within either of the corresponding curved channels of the valve-stem heads, will securely lock them and hold them in place.

I have here described the checks as connected with the main valves c c'; but it will be manifest that the same results can be attained by having two pipes leading from the chamber E to the elevator-cylinder, each having an operating-valve and a check-valve of common form, one operating to raise the elevator and the other when it descends.

Having thus described my invention, what I claim as new, and desire to secure by Letters Patent, is—

1. In a hydraulic elevator, the cage with the hydraulic cylinder and piston, a pressure-chamber containing water, a valve mechanism operated from the cage-rope so as to open and close steam supply and exhaust valves, whereby pressure may be admitted upon the surface of the water within the chamber, and water-valves connecting the bottom of said chamber with the elevator-cylinder, with a mechanism whereby said valves may be opened or closed, and independent automatically-operating check-valves connected with said water-valves, substantially as herein described.

2. In a hydraulic elevator, the water-cylinder and piston moving therein and connected with the cage of the elevator, a pressure-chamber containing an inelastic liquid, and valves whereby an elastic medium may be admitted to press upon the upper surface of the water within the chamber, in combination with water-valves through which communication is made between the bottom of the chamber and the elevator-cylinder, mechanism whereby one of said valves is closed and the other opened, and automatically-operating check-valves acting in conjunction with the main valves and closing in opposite directions, substantially as herein described.

3. The water-valves controlling the admission and escape of the water between the pressure-chamber and the elevator-cylinder, the mechanism consisting of the rotary disk actuated from the cage-rope, the semicircular projecting lug, and the yokes or heads fixed to the valve-stems so as to be engaged by said lug when the disk is rotated, said lug acting as a lock to retain the valves in position, substantially as herein described.

4. In a hydraulic elevator, the water-cylinder and piston moving therein and connected with the cage of the elevator, a pressure-chamber containing an inelastic liquid, valves whereby an elastic medium is admitted to press upon the upper surface of the liquid, and a system of valves including the supplemental valves d and d', controlling the flow of water between the pressure-chamber and the elevator-cylinder, so as to prevent any flow of water to or from the elevator-cylinder in a direction which will move the cage in the opposite direction from that which is intended, substantially as herein described.

In witness whereof I have hereunto set my hand.

COFRAN I. HALL.

Witnesses:
GEO. H. STRONG,
S. H. NOURSE.